United States Patent [19]  [11] 4,115,126
Whitney, III  [45] Sep. 19, 1978

[54] MAGENTA TRIPHENYLMETHANE ANTIHALATION DYES FOR PHOTOGRAPHIC ELEMENTS

[75] Inventor: George Crosier Whitney, III, Fair Haven, N.J.

[73] Assignee: E. I. Du Pont de Nemours and Company, Wilmington, Del.

[21] Appl. No.: 766,421

[22] Filed: Jan. 27, 1977

[51] Int. Cl.² .................. G03C 1/84; C09B 11/14
[52] U.S. Cl. ..................... 96/84 R; 260/390; 8/177 AB
[58] Field of Search ............ 260/390; 96/84 R; 8/177 AB

[56] References Cited

U.S. PATENT DOCUMENTS

| | | | |
|---|---|---|---|
| 1,912,797 | 6/1933 | Schneider | 96/84 R |
| 2,606,833 | 8/1952 | Glickman | 96/84 R |
| 3,005,711 | 10/1961 | Burgardt et al. | 96/84 R |
| 3,382,074 | 5/1968 | Kimura et al. | 96/84 |
| 3,406,069 | 10/1968 | Overman | 96/74 |
| 3,647,349 | 3/1972 | Raue et al. | 260/390 |

FOREIGN PATENT DOCUMENTS 443,027  2/1936  United Kingdom ............ 96/84 R

Primary Examiner—Allen B. Curtis
Assistant Examiner—Raymond K. Covington

[57] ABSTRACT

Novel magenta dyes of the following structure

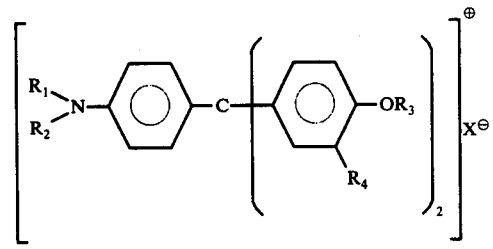

where $R_1$ and $R_2$ = same or different lower alkyl ($C_1$-$C_5$) groups, optionally substituted; wherein when $R_3$ = a lower alkyl group, then $R_4$ = —$(CH_2)_n CO_2 H$; and when $R_4$ = hydrogen, then $R_3$ = $(CH_2)_n CO_2 H$; where $n$ = an integer from 1-4, and X is a salt-forming anion.

These dyes are particularly useful in photographic elements comprising a support, a photosensitive silver halide layer, and a filter layer or antihalation layer containing an organic binder.

7 Claims, No Drawings

MAGENTA TRIPHENYLMETHANE ANTIHALATION DYES FOR PHOTOGRAPHIC ELEMENTS

BACKGROUND OF THE INVENTION

It is known in the art to incorporate light-absorptive dyes into photographic elements for anti-halation or light filtration purposes, and to either coat dye-containing media upon surfaces of photographic elements or incorporate them into a layer or layers thereof. It is desirable that such antihalation and filter dyes be sufficiently immobile or nondiffusing to prevent dye migration into adjacent photosensitive (e.g. silver halide) layers. Excessive dye migration can cause fogging and may reduce the sensitivity of certain photosensitive materials. It is also desirable that such dyes undergo substantially complete bleaching during normal development of fixing processes, leaving essentially no residual stain.

Very few dye materials known to the art combine these desirable features. Those dyes which are sufficiently hydrophilic to permit ready bleaching commonly exhibit a tendency to migrate into other layers of photographic elements. Dyes which are sufficiently immobile to prevent migration usually are not readily and completely bleached by common processing solutions. Furthermore, many of them do not have sufficiently narrow absorption spectra and high extinction coefficients in the desired regions of the spectrum.

SUMMARY OF THE INVENTION

This invention provides magenta dyes which are particularly useful in antihalation layers for photographic film. More specifically, these dyes are useful in a photographic element which comprises a support, a light-sensitive silver halide layer, and an antihalation layer composed of an organic binder and a dye of this invention, optionally mixed with other antihalation substances.

The new magenta dyes are triarylmethanes which have the general formula:

$$\left[ R_1\atop R_2 \!\!\!>\!\! N\text{—}\!\!\bigcirc\!\!\text{—}C\!\!\left(\!\!\bigcirc\!\!{-OR_3\atop R_4}\!\!\right)_{\!2}\right]^{\!\oplus}\!\!X^{\ominus}$$

where $R_1$ and $R_2$ are $C_1$ to $C_5$ alkyl, 2-cyanoethyl, or 2-chloroethyl; $R_3$ is a $C_1$–$C_4$ alkyl group or —$(CH_2)_n CO_2H$;

$R_4$ is —$(CH_2)_n$—$CO_2H$ or hydrogen; and wherein when $R_3$ is a $C_1$–$C_4$ alkyl group, then $R_4$ is —$(CH_2)_n$—$CO_2H$; and when $R_4$ is hydrogen, then $R_3$ is —$(CH_2)_n$-$CO_2H$; $n$ is an integer from 1–4;

$X^-$ is a salt-forming anion.

In a preferred embodiment the dye of the present invention is incorporated into a separate antihalation layer on the back surface of a photographic film. In another embodiment the dye is incorporated directly into the light-sensitive layer, or into an underlayer, with suitable mordanting agents.

DETAILED DESCRIPTION OF THE INVENTION

The new magenta dyes, defined above, possess a combination of properties which make them uniquely useful in photographic silver halide materials wherein filter dyes, antihalation dyes, and/or screening dyes are used. Specifically these dyes are relatively nonmigratory, stable, mordanted by known procedures, irreversibly dischargeable in photographic processing solutions, and able to absorb strongly between 520–570 nm.

Accordingly, they meet the severe demands that are made on antihalation dyes, filter dyes and screening dyes for photographic silver halide materials; in other words, they only moderately desensitize or fog a light-sensitive silver halide emulsion, are well miscible with a photographic colloid, e.g., gelatin, can be incorporated easily into the photographic material, possess an intensive tinctorial strength and, most importantly, are discharged quickly, completely and irreversibly without formation of colored degradation products in an alkaline or acid reducing medium, such as an alkaline photographic developing bath or an acid fixing bath containing sodium hydrogen sulfite. The complete dischargeability of the inventive dyes is most unusual for triarylmethane dyes.

The structural formulae of some exemplary dyes corresponding to the above general formula are listed in the following table.

TABLE I
CARBOXY DERIVATIVES OF MAGENTA TRIARYMETHANE DYES

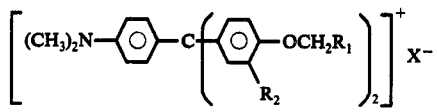

| No. | $R_1$ | $R_2$ | Absorption max. (nm) |
|---|---|---|---|
| 1 | H | $CH_2CO_2H$ | 548 (518) |
| 2 | H | $CH_2CH_2CO_2H$ | 555 |
| 3 | $CH_2CO_2H$ | H | 540 |
| 4 | $CH_2CH_2CO_2H$ | H | 550 |
| 5 | $(CH_2)_4CO_2H$ | H | 560 |
| 6 | | | |

6  $(ClCH_2CH_2)_2N\!\!-\!\!\bigcirc\!\!-\!\!C\!\!\left(\!\!\bigcirc\!\!-\!\!O\!\!-\!\!CH_2CH_2CO_2H\right)_2^{+} X^-$ Abs. max. 540 nm 7  $(CH_3CH_2)_2\!\!-\!\!N\!\!-\!\!\bigcirc\!\!-\!\!C\!\!\left(\!\!{\bigcirc\!\!-\!\!OCH_3\atop CH_2CH_2CO_2H}\!\!\right)_2^{\!+} X^-$ Abs. max. 555 nm 8  $(CNCH_2CH_2)_2N\!\!-\!\!\bigcirc\!\!-\!\!C\!\!\left(\!\!{\bigcirc\!\!-\!\!OCH_3\atop CH_2CH_2CO_2H}\!\!\right)_2^{\!+} X^-$ Abs. max. 558 nm The alkoxy substituents combined with the dialkylamino group give the desired chromophore (540–550 nm), while the carboxylic acid substituent, separated from the chromophore by a methylene linkage, enhances solubility in the basic developer.

Preparation of these magenta dyes is readily effected by known methods from available intermediates, for example, by condensation of two moles of either an o-alkoxyphenyl-ω-alkanoic acid or an ω-phenoxyalkanoic acid with one mole of a p-amino-benzaldehyde substituted in a manner corresponding to the general formula, to form the leuco compound, and oxidation of the leuco compound, for example with nitrite, to form the dye base. Suitable aminobenzaldehydes are, for example, p-N,N-dimethylaminobenzaldehyde, p-N,N-diethylaminobenzaldehyde, p-N,N-bis(2-chloroethyl) aminobenzaldehyde, p-N,N-bis(2-cyanoethyl) aminobenzaldehyde, etc. Suitable o-alkoxyphenyl-ω-alkanoic acids are, for example, 2-ethoxyphenylacetic acid, 3-(2-methoxyphenyl)-propionic acid, and 4-(2-methoxyphenyl)-butyric acid. Suitable ω-phenoxyalkanoic acids are, for example, phenoxyacetic acid, 3-phenoxypropionic acid, 5-phenoxypentanoic acid.

A convenient process for effecting the condensation reaction is as follows: The aldehyde (0.05 mole) and alkanoic acid (0.1 mole) are added to 90% sulfuric acid (88g), cooled to 15°–20° C; a slight temperature rise is observed, and the resulting solution immediately turns to a magenta color. The reaction mixture is then stirred 24 hrs. at room temperature. At this point, the leuco form of the dye can be isolated by adding the reaction mixture carefully to 400g of ice and collecting the precipitate for subsequent oxidation. However, the normal procedure is to cool the reaction to 15° C and add 50g of $H_2SO_4 \cdot H_2O$ (monohydrate). The oxidation is then carried out using $NaNO_2$ (1.75 g) added portionwise over a 4-hour period, with stirring, and stirring the reaction mixture ca. 16 hrs. The mixture is then added carefully to 400g of water and after stirring for 30 minutes the filtrate is collected.

In those cases in which the leuco form of the dye was isolated, the oxidation may be carried out with $PbO_2$ in an acetic acid/HCl mixture, ceric ammonium sulfate in aqueous acetic acid, or $NaNO_2$ in acetic acid.

Overall yields or 80–90% are obtained by oxidizing without isolating the leuco from of the dye. Yields drop to 60–70% in those cases where the leuco is first isolated. The magenta dyes can also be obtained when concentrated hydrochloric aid is substituted for the 90% $H_2SO_4$. In this procedure 0.1 mole of the aldehyde and 0.2 mole of the phenoxy derivative are added to 100 ml of concentrated HCl and heated for 20 hrs. at 80° C. The reaction mixture is added to 300g of ice and partially neutralized by adding 60g of sodium acetate in 250 ml of water. The leuco compound is collected by filtration. Yields for this method are 60–70%.

The dyestuffs according to the invention can be incorporated in any photographic material based on light-sensitive silver halide when easily dischargeable dyestuffs are desired or necessary. Examples of applications of these dyes are: in an antihalation layer, e.g., between the support and a light-sensitive silver halide emulsion layer or at the backside of the support, in a filter layer above or between the light-sensitive silver halide emulsion layers, or as screening dye in a light-sensitive layer. Said dyestuffs when used as screening dye in a light-sensitive silver halide emulsion layer do not significantly decrease the inherent and/or spectral sensitivity of the silver halide.

The dyes according to the present invention can be incorporated into a photographic material according to any technique known to those skilled in the art, for example:

(a) A solution of the dye, in its free carboxylic acid form, in a suitable organic water-miscible and/or water-immiscible solvent, is dispersed in a hydrophilic colloid solution, preferably an aqueous gelatin solution, optionally in the presence of a wetting agent.

(b) A suspension of the dye in water is finely ground in a mill, e.g., a colloid ball mill, in the presence of a wetting agent; the hydrophilic colloid can be added before or after the milling process.

Although gelatin is the preferred organic binder for dispersing the dyes, other natural or synthetic water-permeable colloid-binding agents may be used alone or in admixture such as albumin, agar-agar, polyvinyl alcohol and its water-soluble derivatives, e.g., partially hydrolyzed polyvinyl acetates, polyvinyl ethers, and acetates containing a large number of intra linear $CH_2CHOH$-groups; hydrolyzed interpolymers of vinyl acetate and unsaturated addition polymerizable compounds such as maleic anhydride, acrylic and methacrylic acid ethyl esters, and styrene; polyvinyl butyraldehyde acetals and polyvinyl sodium o-sulfobenzaldehyde acetals; poly-N-vinyl lactams, the hydrophilic copolymer of N-acrylamide alkyl betaines described in Shacklett, U.S. Pat. No. 2,833,650, and hydrophilic cellulose ether esters.

The film base to which the antihalation layer is applied is the usual photographic film base, as for instance, the cellulose esters, e.g., cellulose acetate, or polyesters, e.g., polyethylene terephthalate.

The concentration of the dye in the layer may vary considerably depending upon the product in which the filter layer is to be used. The coating weight of the dye when used in a filter layer or antihalation layer may be readily adjusted to provide the optical density necessary for the specific use. Typical coating weight for the dye components run from about 4 mg/dm$^2$ to about 35 mg/dm$^2$. Further, the dyestuffs claimed can also be used in admixture with other dyestuffs already known for this purpose to widen the absorption range.

In order to obtain rapid (10–20 secs.) discharge of these novel triphenylmethane antihalation dyes, the developer should have a pH of at least 8 and preferably 9 or higher, and the sulfite concentration should be at least 1.5 g/liter and preferably higher; this level is one-half the normal concentration in common litho developers and 1/25 that in common continuous tone developers. The requirements for the fixer only become important if the dye is not washed out (i.e., short development times such as 10–20 secs.). In that case the fixer should have at least 10 g/liter of sulfite at a pH no lower than 2 to suppress color buildup.

The invention will now be illustrated further by the following specific examples:

EXAMPLES

A. Synthesis:

Dyes 1–8 of Table I were all prepared by the following procedure: the p-dialkylamino-benzaldehyde (0.05 mole) and phenylalkanoic acid derivative (0.1 mole) were added to a stirred solution of 90% sulfuric acid (88g) cooled to 15°–20° C; upon addition, a slight temperature rise was observed and the resulting solution immediately became magenta colored. The reaction mixture was then stirred 24 hrs. at room temperature. The mixture was then cooled to 15° C and sulfuric acid monohydrate (50 g) added. Sodium nitrate (1.75 g) was then added portionwise (4-hour period), followed by further stirring ca. 16 hrs. at room temperature. The mixture was then slowly added to ice water (400 g), stirred an additional 30 minutes, partially neutralized (NaHCO$_3$) and filtered. The precipitated dye was washed with water and dried; yields of 80-90% were obtained. The absorption maxima for dyes 1-8 are listed in Table I; the starting materials in Table II.

B. Evaluation:

Antihalation coatings were prepared by adding the candidate dye (0.2 g) to a solution of gelatin (8 g), water (80 ml) and ethanol (10 ml), heated to 37°-40° C; the pH of these solutions ranged from 5.8 to 6.5. Just prior to coating, either 37% aqueous formaldehyde (0.2 ml) or glyoxal (0.1 ml) was added to the above coating solution. The solution was coated over the sublayer on a polyethylene terephthalate clear film support, prepared as described in Example IV of U.S. Pat. No. 2,779,684, containing a resin sublayer on one side only. After hot air drying, the dry layer was about 2 microns thick; the dye coating was then tested for discharge and stain by dipping for 10 seconds in each of the following solutions in sequence; developer, water wash, fixer, and water wash. Stain after the developer step was compared with the final water wash to determine if color buildup occurred in the acidic fixer wash. The results are summarized in Table II, and amply illustrate the superior bleachability of the dyes of the invention over a related dye (control, absorption max. at 530 nm) which contains a carboxylic acid group attached directly to an aromatic ring.

layer was a terpolymer of vinylidene chloride/methyl acrylate/itaconic acid sequentially polymerized with ethyl acrylate. Coating weights of the dye layers were approximately 100 mg/decimeter$^2$ based on gelatin. The red colored backing layers absorb light in the 470-580 nm region.

To the other side of these two films containing the inventive and control antihalation layers was then coated a conventional blue-sensitive iodobromide silver emulsion. Both films were exposed to light through a step wedge and developed 45 seconds in a developer of the following composition:

| | |
|---|---|
| Water | 1000 cc |
| p-Methylaminophenol (Metol) | 3 gms |
| Sodium Sulfite (Anhydrous) | 20 gms |
| Hydroquinone | 6 gms |
| Sodium Carbonate (Monohydrate) | 75 gms |
| Potassium Bromide | 2 gms |

The films were then fixed for 45 seconds and washed briefly before drying. One liter of aqueous fixer solution contains the following ingredients.

| | |
|---|---|
| Sodium Thiosulfate | 240.0 gms |
| Sodium Sulfite, anhydrous | 15.0 gms |
| Acetic Acid (28%) | 48.0 cc |
| Boric Acid | 7.5 gms |
| Potassium Alum | 15.0 gms |

The following observations were made:

The film which contained dye of Ex. 1 was completely colorless while a pink stain was observed on the TABLE II
Evaluation of Antihalation Coatings

| Example | Aldehyde | Carboxylic Acid | Developer | Water Wash | Fixer |
|---|---|---|---|---|---|
| Control | p-(CH$_3$)$_2$N—C$_6$H$_4$—CHO | o-CH$_3$O—C$_6$H$_4$—CO$_2$H | Light Orange | Red | Pale Red |
| 1 | " | o-CH$_3$O—C$_6$H$_4$—CH$_2$—CO$_2$H | Colorless | Pale | Colorless |
| 2 | " | o-CH$_3$O—C$_6$H$_4$—CH$_2$—CH$_2$—CO$_2$H | " | Magenta " | " |
| 3 | " | C$_6$H$_5$—O—CH$_2$—CO$_2$H | " | " | " |
| 4 | " | C$_6$H$_5$—O—CH$_2$CH$_2$CO$_2$H | " | " | " |
| 5 | " | C$_6$H$_5$—O—(CH$_2$)$_4$—CO$_2$H | " | " | " |
| 6 | p-(ClCH$_2$CH$_2$)$_2$N—C$_6$H$_4$—CHO | C$_6$H$_5$—O—CH$_2$CH$_2$CO$_2$H | " | " | " |
| 7 | p-(C$_2$H$_5$)$_2$N—C$_6$H$_4$—CHO | o-CH$_3$O—C$_6$H$_4$—CH$_2$—CO$_2$H | " | " | " |
| 8 | p-(NCCH$_2$CH$_2$)$_2$N—C$_6$H$_4$—CHO | " | " | " | " |

EXAMPLE 9

This Example illustrates a blue-sensitive emulsion coated on a base having an antihalation backing incorporating the antihalation dyes described herein. Specifically, the dye of Example 1 and the control dye listed in Table II were used to illustrate the complete discharge of the inventive dye, versus the color buildup of the control dye due to the lack of insulating methylene groups for the carboxylic acid. The antihalation coatings were prepared as follows:

One gram of the dye was added to a solution of gelatin (100 g), water (800ml), ethanol (100 ml) and a coating aid, heated to 37°-40° F. The coating aid was the anionic sodium salt of alkylaryl polyether sulfonate (Triton ® X-200). Just prior to coating, 1 ml of glyoxal was added to the solution and the solution coated over the sublayer on a polyethylene terephthalate clear film containing resin sublayer on both sides. The resin subfilm having the control dye. This stain was particularly evident in those areas containing little or no silver image.

Dipping the films into a ceric sulfate etch bath caused an additional buildup of pink stain with the control dye while no stain occurred with the dye of Ex. 1.

Dye discharge occurred in the developer.

EXAMPLES 10-11

These Examples illustrate the use of a magenta dye of this invention in combination with dyes absorbing in the 400-500 nm and 600-700 nm regions to provide a neutral antihalation backing.

For preparing neutral antihalation backings, the following procedure was used: To a solution of gelatin (100 g), water (1500 ml) and ethanol (100 ml) was added 2.0 grams of a yellow dye, 1.0 gm of the magenta dye of Example 1 (Table II) and 0.5 gm of a blue dye. The pH of the solution was adjusted to 6.0 ± .2, a coating aid added, and just prior to coating, 1 ml of glyoxal was added. The solution was coated over the resin sublayer on a polyethylene terephthalate clear film. The coating weight was approximately 80 mg/dm². The visible spectrum of the coated film sample had an absorbance of aproximately 0.5 from 410 to 670 nanometers.

Discharge of this antihalation backing layer was complete in the developer-fixer combinations described previously. This process was repeated using the magenta dye of Example 2 with identical results.

The structures of the known yellow and blue antihalation dyes used are shown below:

Yellow Dye

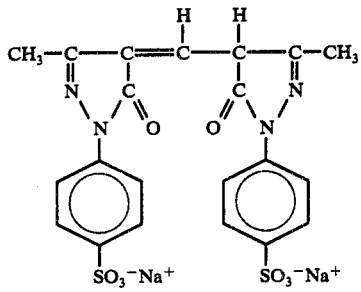

Blue Dye

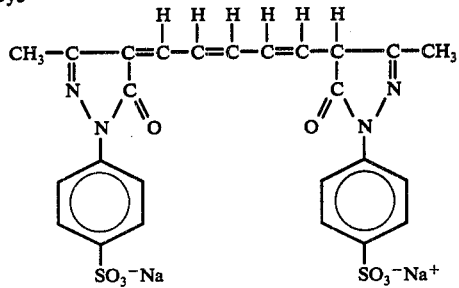

I claim:

1. A magenta dye of the formula

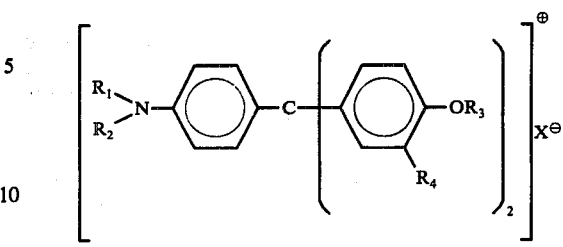

where $R_1$ and $R_2$ are each $C_1$ to $C_5$ alkyl, 2-cyanoethyl, or 2-chloro-ethyl;
wherein $R_3$ is a $C_1$-$C_4$ alkyl group or —(CH$_2$)$_n$—CO$_2$H; and
$R_4$ is hydrogen when $R_3$ is —(CH$_2$)$_n$—CO$_2$H, and is —(CH$_2$)$_n$—CO$_2$H when $R_3$ is $C_1$-$C_4$ alkyl;
$n$ is an integer from 1-4;
and $X^-$ is a salt-forming anion selected from the group consisting of Cl, Br, NO$_3$, and SO$_4$.

2. The dye of claim 1 wherein $R_1$, $R_2$, and $R_3$ are methyl groups, and $R_4$ is —CH$_2$—CO$_2$H.

3. The dye of claim 1 wherein $R_1$ and $R_2$ are methyl groups, $R_3$ is CH$_2$CH$_2$CH$_2$CO$_2$H, and $R_4$ = H.

4. A photographic element comprising a support, a photosensitive silver halide layer, and an antihalation layer composed of an organic binder and the magenta dye of claim 1.

5. The photographic element of claim 4 wherein the photosensitive silver halide layer is affixed to one side of the support, and the antihalation layer to the other side.

6. The photographic element of claim 4 wherein the photosensitive silver halide layer is affixed to one side of the support, and the antihalation layer is incorporated directly into said silver halide layer.

7. The photographic element of claim 4 wherein the photosensitive silver halide layer is affixed to one side of the support, and the antihalation layer is positioned between the support and the silver halide layer.

* * * * *